United States Patent [19]

Nagano

[11] Patent Number: 4,832,662
[45] Date of Patent: May 23, 1989

[54] DERAILLEUR FOR A BICYCLE

[75] Inventor: Masashi Nagano, Izumi, Japan

[73] Assignee: Shimano Industrial Company Limited, Osaka, Japan

[21] Appl. No.: 158,704

[22] Filed: Feb. 22, 1988

[30] Foreign Application Priority Data

Feb. 28, 1987 [JP] Japan ................... 62-46096

[51] Int. Cl.$^4$ ............................................. F16H 11/08
[52] U.S. Cl. ......................................... 474/80; 474/82
[58] Field of Search .............................. 474/69, 78–82; 74/473 R, 475

[56] References Cited

U.S. PATENT DOCUMENTS

| | | | |
|---|---|---|---|
| 3,535,950 | 10/1970 | Shimano et al. | 474/82 X |
| 3,903,751 | 9/1975 | Dian | 474/82 |
| 4,198,873 | 4/1980 | Nagano et al. | 474/82 |
| 4,470,823 | 9/1984 | Shimano | 474/82 |

FOREIGN PATENT DOCUMENTS 2719241 11/1977 Fed. Rep. of Germany .
54-18016 7/1979 Japan .

Primary Examiner—Thuy M. Bui
Attorney, Agent, or Firm—Stevens, Davis, Miller & Mosher

[57] ABSTRACT

A derailleur for a bicycle is provided which includes a deformable linkage mechanism and is adapted to deform the linkage mechanism through a control wire for changing the bicycle speed. A saver arm is supported to the linkage mechanism to be forwardly and backwardly swingably. The control wire is fixed to the saver arm, and a saver spring is interposed between the saver arm and the linkage machanism, the saver arm includes a spring urging portion which deflects the saver spring when the saver arm swings forwardly and backwardly and applies to the saver arm a spring reaction to restore a saver arm in the direction opposite to the swinging direction thereof.

7 Claims, 3 Drawing Sheets

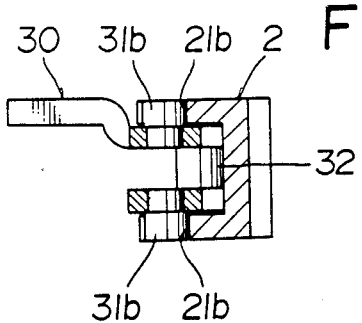
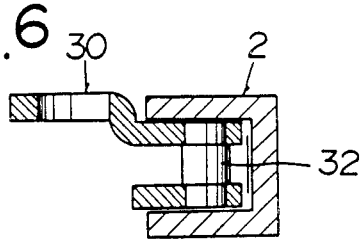
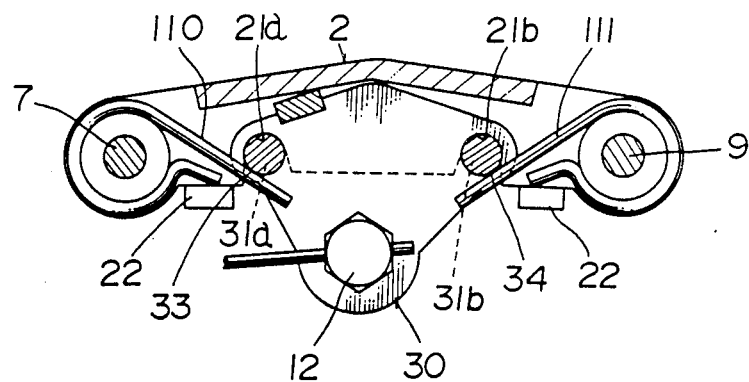
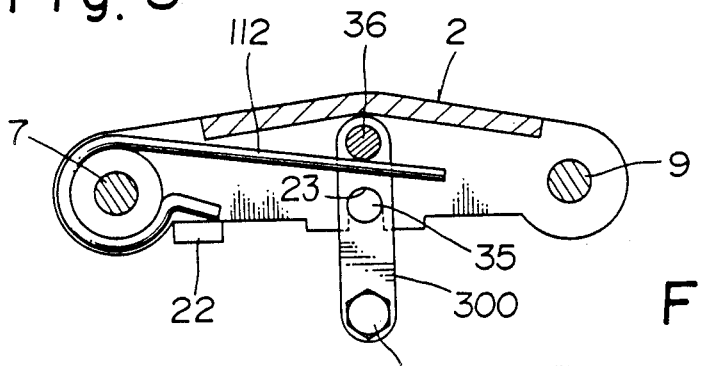
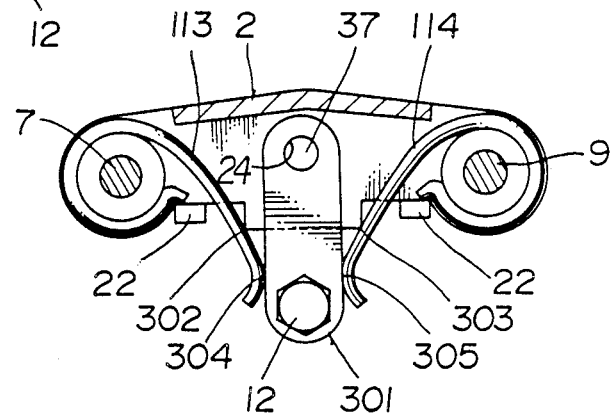

4,832,662

DERAILLEUR FOR A BICYCLE

FIELD OF THE INVENTION

The present invention relates to a derailleur for a bicycle, and more particularly, to a derailleur for a bicycle, which is provided with a deformable linkage mechanism comprising a fixing member, two linkage members and a movable member, and a chain guide, the linkage mechanism being deformed by operating a control wire for changing the bicycle speed.

BACKGROUND OF THE INVENTION

A bicycle derailleur hitherto disclosed in Japanese Patent Publication Gazette No. Sho 54-18,016 is so constructed that a control wire is operable even with a resistance against speed change, when a driving chain in engagement with a sprocket of a multistage sprocket assembly being stationary;is larger than that when the chain normally travels. In this device, the operating force of the control wire is energy-conserved, and when the larger resistance is released, the chain is automatically shifted to a desired sprocket by the conserved energy.

The conventional derailleur uses first and second saver arms supported swingably at both sides of one linkage member at the linkage mechanism. In this device, between each arm and the linkage mechanism are provided saver springs, and an operating arm having projections engageable with the opposite inner surfaces of the saver arms is pivoted to the linkage member. Also the control wire is fixed to the free end of the operating arm and pulled to turn the first saver arm forwardly to energy-conserve the pulling force and pushed to turn the second saver arm backwardly to energy-conserve the pushing force, thereby enabling the driving chain to be shifted by the conserved energy from the top side to the low side and vice versa.

The conventional derailleur, however, uses the two saver arms, saver springs and operating arm to energy-conserve a pulling and pushing forces, thereby creating the problem in that not only the required number of parts is resulting in a complicated construction but also the assembly procedure is troublesome, thus leading to a high manufacturing cost as a whole.

SUMMARY OF THE INVENTION

An object of the invention is to provide a bicycle derailleur, which uses one saver arm and one or two saver springs so that even when a resistance larger than a usual resistance against speed change acts agianst movement of a movable member at the derailleur, effective speed change operation from the top side to the low side and vice versa is ensured.

The derailleur of the invention is provided with (1) a deformable linkage mechanism comprising a fixing member, two linkage members and a movable member, and (2) a chain guide. The linkage mechanism is deformed by operation of a control wire for changing the bicycle speed. The derailleur is characterized by providing one saver arm supported forwardly and backwardly swingably to the linkage mechanism. A wire fixture is mounted on the saver arm at a position spaced apart from the support portion thereof so as to fix the control wire to the saver arm. At least one saver spring is provided with a support portion supported to the linkage mechanism and a spring portion engageable with the saver arm so as to deflect when the saver arm siwngs forwardly and backwardly by operating the control wire, thereby conserving energy required to deform the linkage mechanism. The saver arm includes a spring urging portion which engages with the spring portion at the saver spring and, when the saver arm swings forwardly and backwardly, deflects the saver spring to apply to the saver arm a spring reaction force to restore the saver arm in the reverse direction to the swinging direction thereof.

In the above-described construction, in a condition when the control wire is operated to deform the linkage member for changing the bicycle speed, when a resistance larger than a usual resistance against speed change acts against deformation of the linkage mechanism, in turn against movement of the movable member, the control wire is pulled to move the saver arm against the saver spring to energy-conserve the operating force to the control wire. On the other hand, when the control wire is pushed, the saver arm moves backwardly against the saver spring to energy-conserve the operating force. When such large resistance is released, the pulling force or pushing force of the control wire can shift the chain from the top side to the low side and vice versa.

In the present invention, the saver arm may be supported swingably to the linkage mechanism by use of a pivot shaft, but preferably is supported to the same by use of the saver spring.

In this case, first and second support portions (composed preferably of recesses) for supporting the saver arm are provided at, for example, the linkage member and are spaced apart a predetermined distance the saver arm is provided with first and second engaging portions perferably composed of pins and engageable with the first and second support portions.

In this construction, between the first and second engaging portions is provided a spring urging poriton which engages and deflects the saver spring when the saver arm swings forwardly and backwardly, so as to apply to the saver arm a spring reaction force to restore it in the reverse direction to the swinging direction of the saver arm, thereby using one saver spring to complete the above-described construction.

In a case where two saver springs are used, the first and second engaging portions may be formed of pins, by which the spring urging portions may be constructed.

The above and further objects and novel features of the invention will be more fully apparent from the following detailed description when the same is read in connection with the accompanying drawings.

BRIEF DESCRIPTION OF THE DRAWINGS

FIG. 5 is a sectional view taken on the line V—V in FIG. 2, in which the wire fixture is omitted, FIG. 6 is a sectional view taken on the line VI—VI in FIG. 2, in which the wire fixture is omitted, and FIGS. 7 through 9 are enlarged sectional views of the principal portions of second through fourth embodiments of the derailleur of the invention.

DETAILED DESCRIPTION OF THE INVENTION

Figure 1:
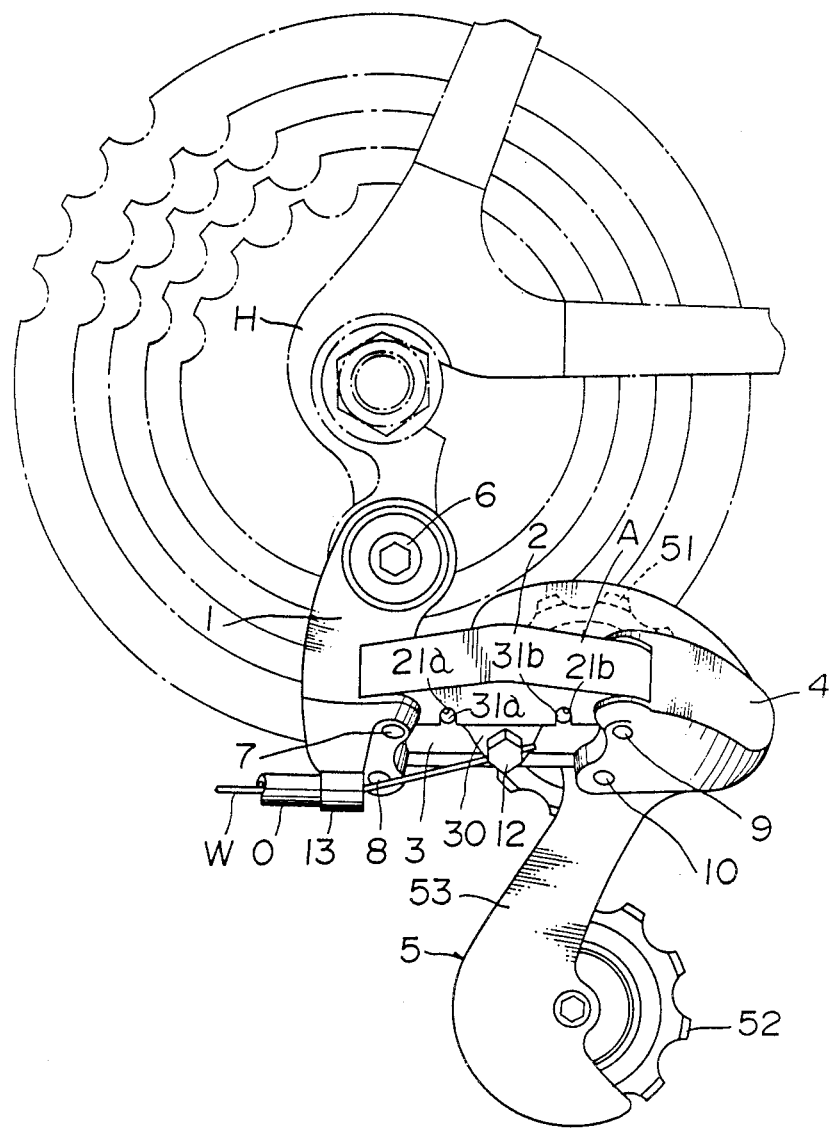
FIG. 1 is a front view of a first embodiment of a derailleur of the invention, which is mounted together with a multistage sprocket assembly on the bicycle frame.

Referring to FIG. 1, a derailleur is shown which is mounted on a fork end H supporting a rear hub of the bicycle and basically comprises a deformable linkage mechanism A comprising a fixing member 1, two linkage members 2 and 3 and a movable member 4, and a chain guide 5, with the fixing member 1 being supported to the fork end H through a horizontal shaft 6.

The linkage members 2 and 3 are pivoted to the fixing member 1 through a pair of pins 7 and 8, with the movable member 4 being pivoted to the free ends of the linkage members 2 and 3 through a pair of pins 9 and 10.

The chain guide 5 comprises a guide pulley 51, a tension pulley 52 and a plate 53 for supporting the pulleys 51 and 52, with the plate 53 being pivoted to the movable member 4 through a horizontal shaft (not shown) parallel to the horizontal shaft 6, and a tension spring (not shown) is provided between the plate 53 and the movable member 4.

The first embodiment of the derailleur of the invention shown in FIGS. 1 through 6 is constructed such that at one linkage member 2 at the linkage mechanism A are provided first and second recessed support portions 21a and 21b spaced at a predetermined interval lengthwise of the linkage member 2. A saver arm 30 having first and second engaging portions 31a and 31b formed of pins and detachably engageable with the first and second support portions 21a and 21b is supported to linkage member 2 to be swingable forwardly and backwardly. A saver spring 11 is interposed between the saver arm 30 and the linkage member 2, a and control wire W is fixed to the free end of the saver arm 30 through a wire fixture 12. In operation, the control wire W is pulled to swing the saver arm 30 forwardly (clockwise in FIG. 1) around the first support portion 21a and is pushed to swing the same backwardly (counterclockwise in FIG. 1) around the second support portion 21b. Between the engaging portions 31a and 31b is provided a spring urging portion 32 which deflects the saver spring 11 when the saver arm 30 swings clockwise and counterclockwise in FIG. 1.

The support portions 21a and 21b are formed, for example, by cutting out one edge of one substantially U-shaped linkage member 2, which are not particularly defined or limited in configuration. Alternatively, the support portions 21a and 21b may be provided at the other linkage member 3, fixing member 1, or movable member 4. Also alternatively, the support portions 21a and 21b may be provided separately at two members of the four members at the linkage mechanism or two pins among the pins 7 through 10.

Figure 2:
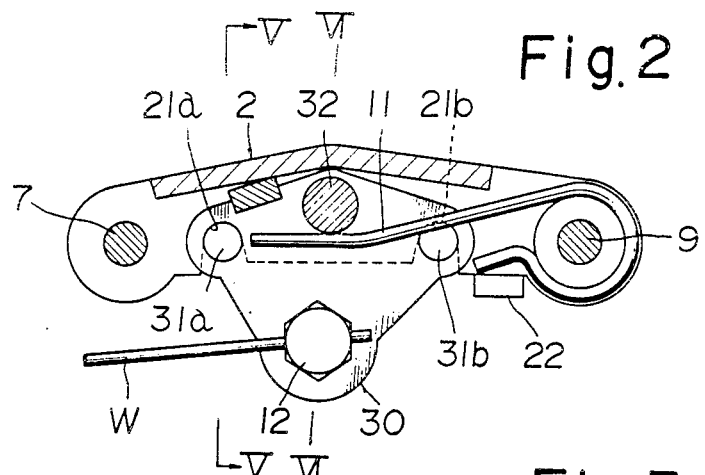
FIG. 2 is an enlarged sectional view of the principal portion of the FIG. 1 embodiment.
Figure 3:
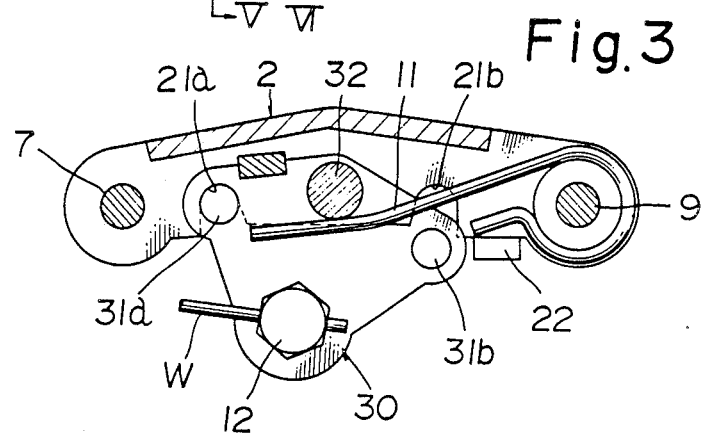
FIGS. 3 and 4 are sectional views showing the operating condition of the derailleur, corresponding to FIG. 2.
Figure 4:
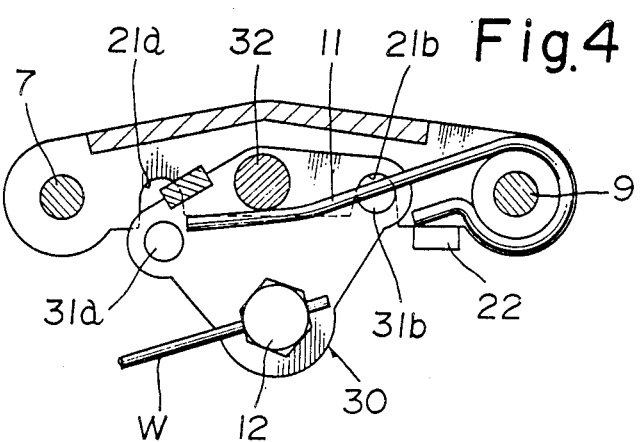

The arm 30, as seen from FIG. 2, is formed in a flat and substantially triangular shape, at two corners of which are erected the engaging portions 31a and 31b formed of pins respectively. Wire fixture 12 is mounted on other corner of the arm 30, and the spring urging portion 32 is provided between the engaging portions 31a and 31b. As a result, an operating force of the saver spring 11 acting on the spring urging portion 32 urges the engaging portions 31a and 31b to the support portions 21a and 21b, thereby holding the saver arm 30 to the linkage member 2.

The saver spring 11 comprises a support portion 11a wound around the pin 9 and a spring portion 11b abutting against the spring urging poriton 32, the support portion 11a abutting at an end thereof against a spring holder 22 at the linkage member 2. Also, the saver spring 11 is adapted to be given a predetermined preload so as to deform the linkage mechanism A by use of conserved energy acting on the saver arm 30, thereby ensuring that the chain is shifted from the smaller diameter sprocket to the larger diameter one.

The control wire W preferably uses a push-pull type wire which is less in deflection.

In addition, a reference character O in FIG. 1 designates an outer sheath supported to the fixing member 1 through an outer sheath holder 13.

In the above construction, when a resistance larger than a usual resistance against speed change acts against movement of movable member 4, the control wire W is pulled to rotate the saver arm 30 clockwise around the first support portion 21a against the saver spring 11, thereby conserving energy of the pulling force. When the resistance applied to the movable member 4 is released, the conserved energy which is given to the arm 30 swings the linkage members 2 and 3 toward the larger diameter sprocket to thereby move the movable member 4, thereby shifting the chain from a smaller diameter sprocket (at the top side) to a larger diameter one (at the low side).

Also, when the resistance larger than the usual resistance against speed change acts against movement of movable member 4, the control wire W is pushed to shift the chain in engagement with the larger diameter sprocket to the smaller diameter sprocket for changing the speed from the low side to the top side. Hence, the saver arm 30 rotates counterclockwise around the second support portion 21b against the saver spring 11, thereby conserving energy of the pushing force. When the resistance applied to the movable member 4 is released therefrom, the conserved energy given to the arm 30 swings the linkage members 2 and 3 toward the smaller diameter sprocket, thereby moving the movable member 4 to shift the chain to the smaller diameter sprocket.

In the aforesaid embodiment, a very simple construction of one saver arm 30 and one saver spring 11 conserves the energy of pulling or pushing force of the control wire W to shift the chain from the top side to the low side and vice versa for changing the bicycle speed, resulting in a low manufacturing cost of the derailleur as a whole.

Moreover, the saver arm 30 is not pivoted to the linkage member 2, but is supported thereto by use of the reaction of saver spring 11, thereby being simple in support construction and superior in the assembly work efficiency, and not requiring the processing of the support portion with high accuracy, thus resulting in a low manufacturing cost to that extent.

Since the saver spring 11 is supported to the linkage member 2 apart from the support position of the arm 30 thereto, a twist angle of the saver spring 11 can be reduced with respect to a swinging angle of the arm 30, thereby lightly deflecting the saver spring 11 to conserve in the arm 30 energy from the pulling or pushing force of the control wire W. In other words, when the saver spring is supported around the saver arm as in the conventional example, the twist angle of saver spring 11 is equal to the swinging angle of the saver arm 30. Hence, when the derailleur is used together with a multistage sprocket assembly, the operation of shifting the chain toward the larger diameter sprocket becomes especially heavy, but the aforesaid construction of the invention provides for the twist angle of saver spring 11 to be smaller than the swinging angle of saver arm 30, so that even when the derailleur is used together with the multistage sprocket assembly, the chain can be shifted lightly to the larger diameter sprocket. In addition, in the conventional example, a saver spring having a small spring constant is used to enable light operation for conserving energy. In this case, however, since an amount of deflection of the saver spring increases until a predetermined preload is given thereto, the saver spring is used in a range of larger deflection, thereby deteriorating the durability of the spring to that extent. In contrast, the present invention does not reduce the spring constant of saver spring 11, but reduces the twist angle thereof with respect to the swinging angle of saver arm 30 to enable light operation, whereby the saving spring 11 has good durability.

Alternatively, as shown in a second embodiment in FIG. 7, two saver springs 110 and 111 may be supported around the pins 7 and 9, one saver spring 110 abutting at one end against a first spring urging portion 33, the other saver spring 111 at one end against a second spring urging portion 34. In addition, in FIG. 7, the outer peripheries of engaging portions 31a and 31b of pins are preferably used as the first and second urging portions 33 and 34.

Alternatively, as shown in FIG. 8 or 9, one support portion 23 or 24 may be provided at the linkage member 2, to which an arm 300 or 301 may be supported.

A third embodiment shown in FIG. 8 includes a linkage member 2 with a recessed support portion 23, and an engaging portion 35 formed of a pin is provided at an intermediate portion of the saver arm 300 so that the arm 300 is supported to the linkage member 2 through engagement of the engaging portion 35 with the support portion 23 Control wire W is fixed to a wire fixture 12 provided at the free end of the arm 300, and a spring urging portion 36 is provided at an extension of the saver arm 300 at the reverse side to the fixture 12 with respect to the engaging portion 35. A saver spring 112 is provided between the spring urging portion 36 and the linkage member 2, so that when the saver arm 300 swings forwardly and backwardly, the saver spring 112 is adapted to be deflected.

A fourth embodiment shown in FIG. 9 is so constructed that a saver arm 301 is pivoted to the linkage member 2 through a pivot shaft 37, and the linkage member 2 is provided with a pair of spring holding portions 302 and 303 for stopping a pair of saver springs 113 and 114 at the intermediate portions thereof respectively, First and second spring urging portions 304 and 305 engageable with the saver springs 113 and 114 are provided at both widthwise side surfaces of the arm 301, and the two saver springs 113 and 114 are interposed between the urging portions 304 and 305 and the linkage member 2 and abut at the intermediate portions 55 against the spring holding portions 302 and 303 respectively, thereby preventing the saver arm 301 from being subjected to the reaction of either one of saver springs 113 and 114 when the saver arm 301 swings forwardly or backwardly.

In other words, the saver arm 301, when turning clockwise in FIG. 9, is prevented from being subjected to the reaction of the right-hand saver spring 114, and when turning counterclockwise, is prevented from being subjected to the reaction of the left-hand saver spring 113.

In addition, in FIG. 9, the pair of saver springs 113 and 114 may be replaced by a single spring. For example, one saver spring may be wound around the pivot shaft 37 and abut at one end against the first spring urging portion 304 and at the other end against the second urging portion 305 respectively, with both legs of the saver spring abutting at thier intermediate portions against the spring holders provided at the linkage members 2 respectively.

The saver arms 300 and 301 in the third and fourth embodiments in FIGS. 8 and 9 may alternatively be supported to the other linkage member 3, the fixing member 1, the movable member 4, or one of the pins 7 through 10. Also, the saver arms 300 and 301 may indirectly be supported through a third member to the above members rather than being directly supported thereto.

Alternatively, two pull-type control wires each relatively larger in deflection may of course be used for the derailleur of the invention.

As seen from the above, the derailleur of the invention supports one saver arm swingably to one saver arm, interposes the saver spring between the saver arm and the linkage mechanism, swings the saver arm forwardly and backwardly by operating the control wire fixed to the arm, and is provided with the spring urging portion for deflecting the saver spring when the saver arm swings, This ensures the speed change from the top side to the low side and vice versa even when the movement of the movable member is subjected to a resistance larger than that against speed change in the normal condition. Moreover, the derailleur using one saver arm and saver spring requires less parts, is simple in construction, has high assembly work efficiency, and is inexpensive to produce as a whole.

Although several embodiments have been described, they are merely exemplary of the invention and not to be construed as limiting, the invention being defined solely by the appended claims.

What is claimed is:
1. A derailleur for a bicycle comprising:
a deformable linkage mechanism adapted to be deformed by a control wire for changing the bicycle speed;
a saver arm supported swingably to said linkage mechanism to move forwardly and backwardly relative thereto;
a wire fixture mounted on said saver arm at a position spaced apart from a support portion at which said saver arm is supported to said linkage mechanism, said wire fixture comprising means for fixing said control wire thereto;
at least one saver spring means including a support portion at which said saver spring means is supported to said linkage mechanism and a spring portion engageable with said saver arm, said saver spring means for deflecting responsive to operation of said control wire to swing said saver arm forwardly and backwardly relative to said linkage mechanism to conserve energy required to deform said linkage mechanism, and
said saver arm including a spring urging portion engageable with said spring portion of said saver spring means to deflect said saver spring means responsive to swinging of said saver arm forwardly and backwardly relative to said linkage mechanism to provide a spring reaction to said saver arm to restore said saver arm in a direction opposite to a swinging direction thereof, wherein said linkage mechanism is provided with first and second sup- porting portions for supporting said saver arm, said supporting portions being spaced from each other a predetermined distance, said saver arm being provided with first and second engaging portions engageable with said first and second support portions, said saver spring means comprising means for providing a spring reaction force which urges said engaging portions into engagement with said supporting portions to support said saver arm to said linkage mechanism.

2. A derailleur for a bicycle according to claim 1, wherein said spring urging portion is disposed between first and second engaging portions of said saver arm.

3. A derailleur for a bicycle according to claim 1, wherein said saver spring means comprises a pair of saver springs, said saver arm being provided with (i) a first spring urging portion which deflects one of said saver springs responsive to forward swinging of said saver arm and which applies to said saver arm a spring reaction to restore said saver arm in a backward direction and (ii) a second spring urging portion which deflects the other of said saver springs responsive to backward swinging of said saver arm and which applies to said saver arm a spring reaction to restore said saver arm in a forward direction.

4. A derailleur for a bicycle according to claim 3, wherein said first and second engaging portions respectively are formed of pins, and said first and second spring urging portions are provided at said first and second engaging portions respectively.

5. A derailleur for a bicycle, comprising:
a deformable linkage mechanism adapted to be deformed by a control wire for changing the bicycle speed;
a saver arm supported swingably to said linkage mechanism to move forwardly and backwardly relative thereto;
a wire fixture mounted on said saver arm at a position spaced apart from a support portion at which said saver arm is supported to said linkage mechanism, said wire fixture comprising means for fixing said control wire thereto;
at least one saver spring means including a support portion at which said saver spring means is supported to said linkage mechanism and a spring portion engageable with said saver arm, said saver spring means for deflecting responsive to operation of said control wire to swing said saver arm forwardly and backwardly relative to said linkage mechanism to conserve energy required to deform said linkage mechanism, and
said saver arm including a spring urging portion engageable with said spring portion of said saver spring means to deflect said saver spring means responsive to swinging of said saver arm forwardly and backwardly relative to said linkage mechanism to provide a spring reaction to said saver arm to restore said saver arm in a direction opposite to a swinging direction thereof,
said linkage mechanism comprising at least one supporting portion for supporting said saver arm, said saver arm including at least one engaging portion engageable with said supporting portion, said saver spring means comprising means for providing a spring reacting force which urges said engaging portion into engagement with said supporting portion to support said saver arm to said linkage mechanism.

6. A derailleur for a bicycle according to claim 5, wherein said wire fixture and said spring urging portion are provided on opposite sides of said engaging portion, whereby said saver spring means engages with said spring urging portion.

7. A derailleur for a bicycle, comprising:
a deformable linkage mechanism adapted to be deformed by a control wire for changing the bicycle speed;
a saver arm supported swingably to said linkage mechanism to move forwardly and backwardly relative thereto;
a wire fixture mounted on said saver arm at a position spaced apart from a support portion at which said saver arm is supported to said linkage mechanism, said wire fixture comprising means for fixing said control wire thereto;
at least one saver spring means including a support portion at which said saver spring means is supported to said linkage mechanism and a spring portion engageable with said saver arm, said saver spring means for deflecting responsive to operation of said control wire to swing said saver arm forwardly and backwardly relative to said linkage mechanism to conserve energy required to deform said linkage mechanism, and
said saver arm including a spring urging portion engageable with said spring portion of said saver spring means to deflect said saver spring means responsive to swinging of said saver arm forwardly and backwardly relative to said linkage mechanism to provide a spring reaction to said saver arm to restore said saver arm in a direction opposite to a swinging direction thereof, wherein said saver arm is swingably pivoted to said linkage mechanism by a pivot shaft and said saver spring means comprises a pair of saver springs, said saver arm being provided with a first spring urging portion which deflects one of said saver springs responsive to forward swinging of said saver arm to apply to said saver arm a spring reaction force to restore said saver arm in a backward direction and a second spring urging portion which deflects the other of said saver springs responsive to backward swinging of said saver arm to apply to said saver arm a spring reaction force for restoring said saver arm in a forward direction.

* * * * *